US011931898B2

(12) United States Patent
Berard et al.

(10) Patent No.: US 11,931,898 B2
(45) Date of Patent: Mar. 19, 2024

(54) ARM AND BODY COORDINATION

(71) Applicant: Boston Dynamics, Inc., Waltham, MA (US)

(72) Inventors: Stephen George Berard, Burlington, MA (US); Andrew James Barry, Cambridge, MA (US); Benjamin John Swilling, Winchester, MA (US); Alfred Anthony Rizzi, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 293 days.

(21) Appl. No.: 17/318,435

(22) Filed: May 12, 2021

(65) Prior Publication Data
US 2022/0193900 A1 Jun. 23, 2022

Related U.S. Application Data

(60) Provisional application No. 63/129,398, filed on Dec. 22, 2020.

(51) Int. Cl.
*B25J 9/16* (2006.01)
*G05D 1/00* (2006.01)
(Continued)

(52) U.S. Cl.
CPC .......... *B25J 9/1661* (2013.01); *B25J 9/1664* (2013.01); *G05D 1/021* (2013.01); *B25J 5/00* (2013.01);
(Continued)

(58) Field of Classification Search
CPC . B25J 9/1661; B25J 9/1664; B25J 5/00; B25J 5/007; B25J 9/162; B25J 9/1653;
(Continued)

(56) References Cited

U.S. PATENT DOCUMENTS 5,550,953 A * 8/1996 Seraji ................. B25J 9/162
 700/262
7,313,463 B2 12/2007 Herr et al.
(Continued)

FOREIGN PATENT DOCUMENTS

JP 2005 088164 A 4/2005
JP 2006051564 2/2006
(Continued)

OTHER PUBLICATIONS

Rehman, Bilal, et al., "Towards a Multi-legged Mobile Manipulator," May 2016, 2016 IEEE International Conference on Robotics and Automation (ICRA), pp. 3618-3624 (Year: 2016).*
(Continued)

*Primary Examiner* — Abby Y Lin
*Assistant Examiner* — Karston G. Evans
(74) *Attorney, Agent, or Firm* — Knobbe, Martens, Olson & Bear, LLP

(57) ABSTRACT

A computer-implemented method, when executed by data processing hardware of a robot having an articulated arm and a base, causes data processing hardware to perform operations. The operations include determining a first location of a workspace of the articulated arm associated with a current base configuration of the base of the robot. The operations also include receiving a task request defining a task for the robot to perform outside of the workspace of the articulated arm at the first location. The operations also include generating base parameters associated with the task request. The operations further include instructing, using the generated base parameters, the base of the robot to move from the current base configuration to an anticipatory base configuration.

22 Claims, 8 Drawing Sheets

(51) Int. Cl.
 *G05D 1/02* (2020.01)
 *B25J 5/00* (2006.01)
(52) U.S. Cl.
 CPC ..... *B25J 5/007* (2013.01); *G05B 2219/40298* (2013.01)
(58) Field of Classification Search
 CPC .................. B25J 13/08; G05D 1/021; G05B 2219/40298; G05B 2219/39172; B62D 57/02–032
 See application file for complete search history.

(56) References Cited

U.S. PATENT DOCUMENTS

| | | | |
|---|---|---|---|
| 7,330,775 B2 | 2/2008 | Orita et al. | |
| 7,658,245 B2 | 2/2010 | Nakamura et al. | |
| 8,942,848 B2 | 1/2015 | Pratt et al. | |
| 9,120,227 B2 | 9/2015 | Zheng et al. | |
| 9,314,934 B2 | 4/2016 | Whitney | |
| 9,389,598 B2 | 7/2016 | Hodgins et al. | |
| 9,440,353 B1* | 9/2016 | da Silva | B25J 9/1605 |
| 9,987,745 B1* | 6/2018 | Berard | B25J 9/1661 |
| 10,065,306 B2 | 9/2018 | Isobe | |
| 10,493,617 B1* | 12/2019 | Holson | B25J 13/088 |
| 11,203,120 B1* | 12/2021 | Hill | B25J 9/0087 |
| 2006/0033462 A1 | 2/2006 | Moridaira | |
| 2006/0129278 A1* | 6/2006 | Sugiyama | B62D 57/032 700/245 |
| 2009/0173560 A1* | 7/2009 | Nakamoto | B25J 9/1612 700/259 |
| 2009/0295324 A1 | 12/2009 | Shim et al. | |
| 2010/0143089 A1* | 6/2010 | Hvass | G05D 1/027 414/754 |
| 2012/0130540 A2* | 5/2012 | Stilman | B25J 5/007 700/254 |
| 2014/0249670 A1 | 9/2014 | Yamane | |
| 2015/0088469 A1 | 3/2015 | Nagarajan et al. | |
| 2015/0343633 A1 | 12/2015 | Gouaillier et al. | |
| 2016/0059408 A1 | 3/2016 | Isobe | |
| 2016/0288324 A1* | 10/2016 | Bradski | G06T 17/00 |
| 2017/0057095 A1 | 3/2017 | Oestergaard et al. | |
| 2019/0009410 A1 | 1/2019 | Radrich | |
| 2019/0134821 A1* | 5/2019 | Patrick | B25J 9/06 |
| 2020/0061835 A1 | 2/2020 | Haddadin et al. | |
| 2020/0368911 A1* | 11/2020 | Takeuchi | B25J 9/1697 |
| 2021/0323148 A1 | 10/2021 | Matsuda et al. | |
| 2022/0193893 A1 | 6/2022 | Paolini et al. | |
| 2023/0008146 A1 | 1/2023 | Spenninger | |

FOREIGN PATENT DOCUMENTS

| | | |
|---|---|---|
| JP | 201649616 A | 4/2016 |
| KR | 20130033920 A | 4/2013 |

OTHER PUBLICATIONS

Paul M Moubarak et al: "Adaptive manipulation of a Hybrid Mechanism Mobile Robot", Robotic and Sensors Environments (ROSE), 2011 IEEE International Symposium on, IEEE, Sep. 17, 2011 (Sep. 17, 2011), pp. 113-118, XP031961263, DOI: 10.1109/ROSE.2011.6058520 ISBN: 978-1-4577-0819-0, 6 pages.

International Search Report and Written Opinion for the related Application No. PCT/US2021/064196, dated Mar. 30, 2022, 88 pages.

Ferrolho et al., "Residual force polytope: Admissible task-space forces of dynamic trajectories". Rob Auton Sys. Aug. 1, 2021;142:103814 (12 pgs.).

* cited by examiner

ARM AND BODY COORDINATION

CROSS REFERENCE TO RELATED APPLICATIONS

This application claims priority under 35 U.S.C. § 119(e) to U.S. Provisional Application 63/129,398, filed on Dec. 22, 2020. The disclosure of this prior application is considered part of the disclosure of this application and is hereby incorporated by reference in its entirety.

TECHNICAL FIELD

This disclosure relates to coordinating arm and body controls in a robot.

BACKGROUND

Robotic arms are increasingly being used in constrained or otherwise restricted environments to perform a variety of tasks or functions. These robotic arms often need to efficiently manipulate constrained objects, such as doors or switches, without requiring large computations. As robotic arms become more prevalent, there is a need for coordinating movements of the robot body based on commands or instructions of the robotic arm.

SUMMARY

One aspect of the disclosure provides computer-implemented method that, when executed by data processing hardware of a robot having an articulated arm and a base, causes the data processing hardware to perform operations. The operations include determining a first location of a workspace of the articulated arm associated with a current base configuration of the base of the robot. The operations also include receiving a task request defining a task for the robot to perform outside of the workspace of the articulated arm at the first location. The operations also include generating base parameters associated with the task request. The operations further include instructing, using the generated base parameters, the base of the robot to move from the current base configuration to an anticipatory base configuration.

Implementations of the disclosure may include one or more of the following optional features. In some implementations, instructing the base of the robot to move from the current base configuration to the anticipatory base configuration includes instructing the base of the robot to move the workspace of the articulated arm from the first location to a second location. In some examples, instructing the base of the robot to move the workspace of the articulated arm from the first location to the second location includes instructing the base of the robot to change one of a location or a pose of the base.

In some examples, the operations further include generating arm instructions for changing a configuration of the articulated arm within the workspace of the articulated arm. In some implementations, the operations further include receiving arm sensor data of the articulated arm associated with changing the configuration of the articulated arm, and instructing, based on the arm sensor data, the base of the robot to move from the anticipatory base configuration to a responsive base configuration. In some configurations, the base parameters include at least one of position coordinates for the robot base or balancing parameters for the robot base.

In some examples, the task request includes a request to move an object outside of the workspace of the articulated arm at the first location. In some configurations, the task request includes instructing the base of the robot to follow a continuous path outside of the workspace of the articulated arm at the first location.

Another aspect of the disclosure provides a robot including a base, an articulated arm coupled to the base, data processing hardware and memory hardware storing instructions that, when executed by the data processing hardware, cause the data processing hardware to perform operations. The operations include determining a first location of a workspace of the articulated arm associated with a current base configuration of the base of the robot. The operations also include receiving a task request defining a task for the robot to perform outside of the workspace of the articulated arm at the first location. The operations also include generating base parameters associated with the task request. The operations further include instructing, using the generated base parameters, the base of the robot to move from the current base configuration to an anticipatory base configuration.

Implementations of the disclosure may include one or more of the following optional features. In some implementations, instructing the base of the robot to move from the current base configuration to the anticipatory base configuration includes instructing the base of the robot to move the workspace of the articulated arm from the first location to a second location. In some examples, instructing the base of the robot to move the workspace of the articulated arm from the first location to the second location includes instructing the base of the robot to change one of a location or a pose of the base.

In some examples, the operations further include generating arm instructions for changing a configuration of the articulated arm within the workspace of the articulated arm. In some implementations, the operations further include receiving arm sensor data of the articulated arm associated with changing the configuration of the articulated arm, and instructing, based on the arm sensor data, the base of the robot to move from the anticipatory base configuration to a responsive base configuration. In some configurations, the base parameters include at least one of position coordinates for the robot base or balancing parameters for the robot base.

In some examples, the task request includes a request to move an object outside of the workspace of the articulated arm at the first location. In some configurations, the task request includes instructing the base of the robot to follow a continuous path outside of the workspace of the articulated arm at the first location.

Another aspect of the disclosure provides a computer program product encoded on a non-transitory computer readable storage medium of a robot including a base and an articulated arm coupled to the base, the computer readable storage medium including instructions that when executed by a data processing apparatus cause the data processing apparatus to perform operations. The operations include determining a first location of a workspace of the articulated arm associated with a current base configuration of the base of the robot. The operations also include receiving a task request defining a task for the robot to perform outside of the workspace of the articulated arm at the first location. The operations also include generating base parameters associated with the task request. The operations further include instructing, using the generated base parameters, the base of the robot to move from the current base configuration to an anticipatory base configuration.

Implementations of the disclosure may include one or more of the following optional features. In some implementations, instructing the base of the robot to move from the current base configuration to the anticipatory base configuration includes instructing the base of the robot to move the workspace of the articulated arm from the first location to a second location. In some examples, instructing the base of the robot to move the workspace of the articulated arm from the first location to the second location includes instructing the base of the robot to change one of a location or a pose of the base.

In some examples, the operations further include generating arm instructions for changing a configuration of the articulated arm within the workspace of the articulated arm. In some implementations, the operations further include receiving arm sensor data of the articulated arm associated with changing the configuration of the articulated arm, and instructing, based on the arm sensor data, the base of the robot to move from the anticipatory base configuration to a responsive base configuration.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Many robots include multi-axis articulable appendages configured to execute complex movements for completing tasks, such as material handling or industrial operations (e.g., welding, gluing, and/or fastening). These appendages, also referred to as manipulators, typically include an end-effector or hand attached at the end of a series appendage segments or portions, which are connected to each other by one or more appendage joints. The appendage joints cooperate to configure the appendage in a variety of poses P within an environment associated with the robot. Here, the term "pose" refers to the position and orientation of the appendage. For example, the position of the appendage may be defined by coordinates (x, y, z) of the appendage within a workspace (Cartesian space) associated with the arm, and the orientation may be defined by angles ($\Theta_x$, $\Theta_y$, $\Theta_z$) of the appendage within the workspace. In use, the appendage may need to perform tasks that are located within the robot environment but outside of the current workspace (i.e., the reach) of the appendage. Thus, to perform the task, the robot may need to move within the environment to place the task target within reach of the appendage.

Figure 1A:
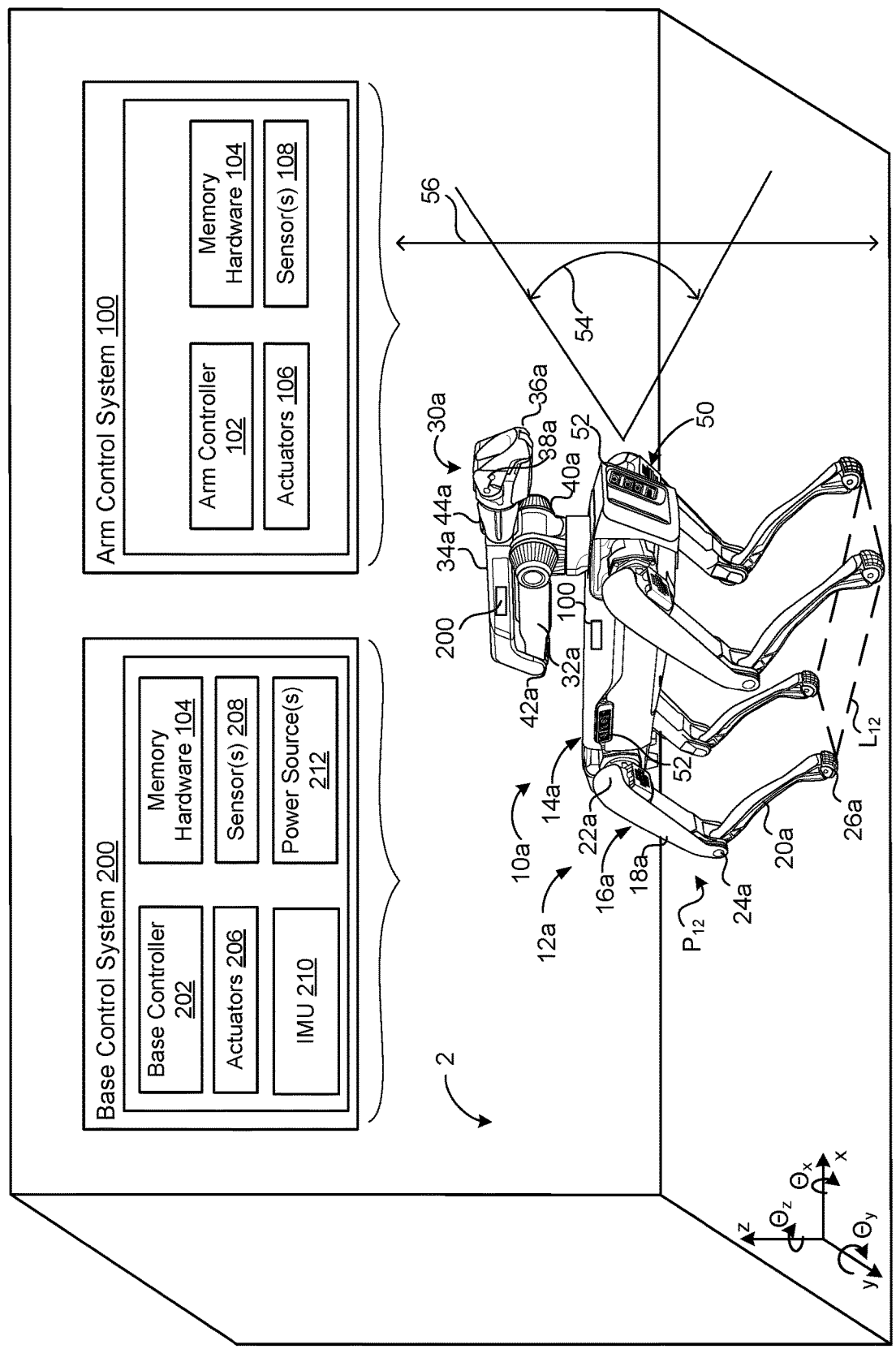
FIGS. 1A and 1B are schematic views of an example robot executing an arm controller and a body controller for performing tasks with an arm of the robot.
Figure 1B:
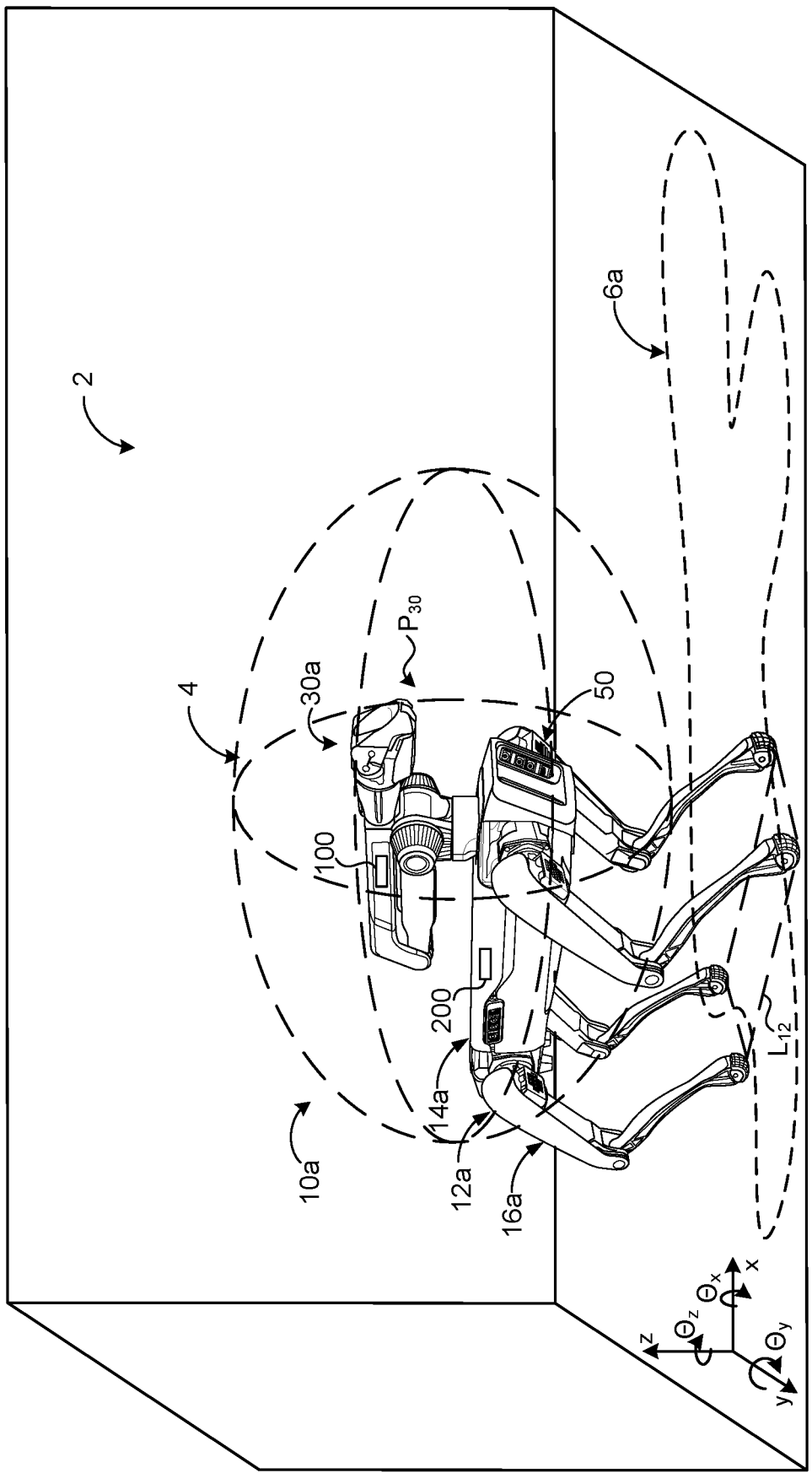
Figure 1C:
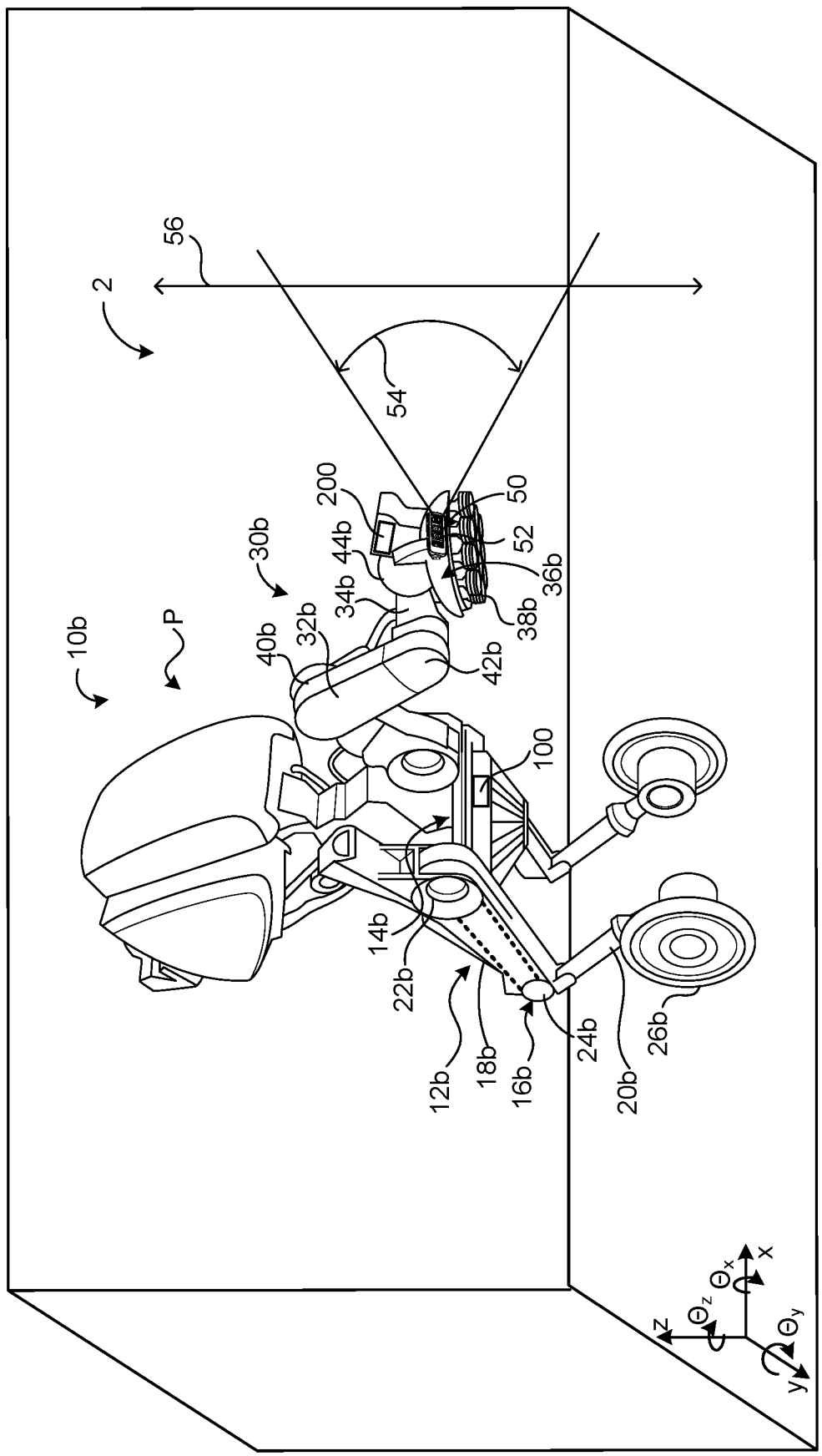
FIGS. 1C and 1D are schematic views of another example robot executing an arm controller and a body controller for performing tasks with an arm of the robot.
Figure 1D:
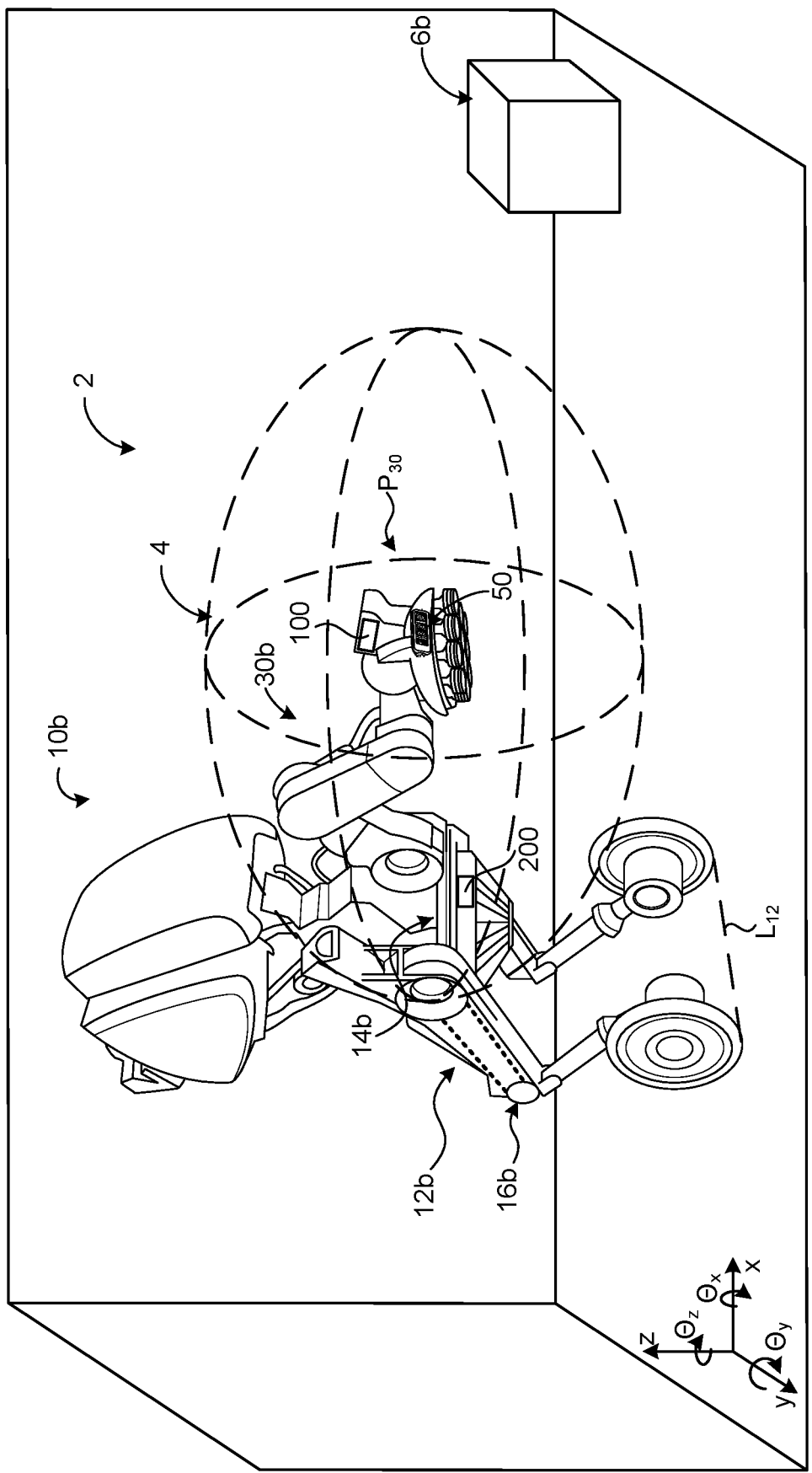

Referring to FIGS. 1A-1D, various examples of a robot 10, 10a, 10b are shown. Examples of the robot 10 include, but are not limited to, a quadrupedal robot 10a (FIGS. 1A-1B) and a wheeled robot 10b (FIGS. 1C-1D). Each robot 10 includes a base 12, 12a, 12b having a body 14, 14a, 14b and a plurality of legs 16, 16a, 16b in communication with a base control system 200. Each leg 16 may have an upper leg portion 18, 18a, 18b and a lower leg portion 20, 20a, 20b. The upper leg portion 18 may be attached to the body 14 at an upper joint 22, 22a, 22b (i.e., a hip joint) and the lower leg portion 20 may be attached to the upper leg portion 18 by an intermediate joint 24, 24a, 24b (i.e., a knee joint). Each leg 16 further includes a foot 26, 26a, 26b disposed at a distal end of the lower leg portion 20, which provides a ground-contacting point for the base 12 of the robot 10. In some examples (FIGS. 1A-1B), the foot 26a is a stationary contact pad 26a. In other examples (FIGS. 1C-1D), the foot 26b includes a mobile element, such as a wheel 26b for allowing the robot base 12b to roll along a ground surface. In some other examples, the foot 26a is omitted and the distal end of the lower leg portion 20 provides the ground-contacting point.

In some implementations, the robot 10 further includes one or more appendages, such as an articulated arm 30, 30a, 30b or manipulator disposed on the body 14 and configured to move relative to the body 14. Moreover, the articulated arm 30 may be interchangeably referred to as a manipulator, an appendage arm, or simply an appendage. In the example shown, the articulated arm 30 includes a first arm portion 32, 32a, 32b rotatable relative to the body 14 and a second arm portion 34, 34a, 34b rotatable relative to the first arm portion 32. However, the articulated arm 30 may include more or less arm portions 32, 34 without departing from the scope of the present disclosure. A third arm portion 36, 36a, 36b of the articulated arm, referred to as an end effector 36 or hand 36, may be interchangeably coupled to a distal end of the second portion 34, 34a, 34b of the articulated arm 30 and may include one or more actuators 38, 38a, 38b for gripping/grasping objects within the environment 2. In the example of FIGS. 1A-1B, the actuators 38a include an articulated grasp or claw for clamping an object. However, in other examples (FIGS. 1C-1D), the actuator 38b may include adhesive grip including magnetic or vacuum actuators.

The articulated arm 30 includes a plurality of joints 40, 42, 44 disposed between adjacent ones of the arm portions 32, 34, 36. In the examples shown, the first arm portion 32 is attached to the body 14 of the robot 10 by a first joint 40, 40a, 40b interchangeably referred to as a shoulder 40. A second joint 42, 42a, 42b connects the first arm portion 32 to the second arm portion 34. In both examples, the second joint 42 includes a single axis of rotation and may be interchangeably referred to as an elbow 42 of the articulated arm 30. A third joint 44, 44a, 44b connects the second arm portion 34 to the end effector 36, and may be interchangeably referred to as a wrist 44 of the articulated arm 30. Accordingly, the joints 40, 42, 44 cooperate to provide the articulated arm 30 with a number of degrees of freedom corresponding to the total number of axis of the joints 40, 42, 44 (e.g., five axes of rotation). While the illustrated example shows five-axis articulated arms 30, the principles of the present disclosure are applicable to robotic arms having any number of axes. The arm portions 32, 34, 36 and joints 40, 42, 44 may be selectively reconfigured to position and orient the end effector 36 within a workspace 4, as discussed below.

In some examples, the robot 10 also includes a vision system 50 with at least one imaging sensor or camera 52. Each sensor or camera 52 captures image data or sensor data of the environment 2 surrounding the robot 10 within an angle of view 54 and a field of view 56. The vision system 50 may be configured to move the field of view 56 by adjusting the angle of view 54 or by panning and/or tilting (either independently or via the robot 10) the camera 52 to move the field of view 56 in any direction. Alternatively, the vision system 50 may include multiple sensors or cameras 52 such that the vision system 50 captures a generally 360-degree field of view around the robot 10. The camera(s) 52 of the vision system 50, in some implementations, include one or more stereo cameras (e.g., one or more RGBD stereo cameras). In other examples, the vision system 50 includes one or more radar sensors such as a scanning light-detection and ranging (LIDAR) sensor, or a scanning laser-detection and ranging (LADAR) sensor, a light scanner, a time-of-flight sensor, or any other three-dimensional (3D) volumetric image sensor (or any such combination of sensors). The vision system 50 may also incorporate a VICON® sensor (e.g., for motion capture), perception sensors, a global positioning system (GPS) device, and/or other sensors for capturing information of the environment 2 in which the robot 10 is operating.

With continued reference to FIG. 1A, the base 12 is connected to a base control system 200 configured to monitor and control operation of the robot base 12. While the base control system 200 is illustrated in FIG. 1A with respect to the example of the robot 10a, the robot 10b in FIG. 1C also includes the base control system 200. In some implementations, the robot base 12 is configured to operate autonomously and/or semi-autonomously. However, a user may also operate the base 12 by providing commands/directions to the base 12 via a remote device 60. In the example shown, the base control system 200 includes a base controller 202 (e.g., data processing hardware), memory hardware 104, actuators 206, one or more sensors 208, an inertial measurement unit (IMU) 210, and one or more power sources 212. The base control system 200 is not limited to the components shown, and may include additional or less components without departing from the scope of the present disclosure. The components may communicate via wireless or wired connections and may be distributed across multiple locations of the base 12. In some configurations, the base control system 200 interfaces with a remote computing device and/or a user. For instance, the base control system 200 may include various components for communicating with the base 12, such as a joystick, buttons, wired communication ports, and/or wireless communication ports for receiving inputs from the remote computing device and/or user, and providing feedback to the remote computing device and/or user.

The base controller 202 corresponds to data processing hardware that may include one or more general purpose processors, digital signal processors, and/or application specific integrated circuits (ASICs). In some implementations, the base controller 202 is a purpose-built embedded device configured to perform specific operations with one or more subsystems of the base 12. The memory hardware 104 is in communication with the base controller 202 and may include one or more non-transitory computer-readable storage media such as volatile and/or non-volatile storage components. For instance, the memory hardware 104 may be associated with one or more physical devices in communication with one another and may include optical, magnetic, organic, or other types of memory or storage. The memory hardware 104 is configured to, inter alia, store instructions (e.g., computer-readable program instructions), that when executed by the base controller 202, cause the base controller 202 to perform numerous operations, such as, without limitation, altering a pose of the robot base 12 for maintaining balance, maneuvering the robot base 12 across the ground surface, transporting objects, and/or executing a sit-to-stand routine.

The base controller 202 may directly or indirectly interact with, the actuators 206, the sensor(s) 208, the inertial measurement unit 210, and the power source(s) 212 for monitoring and controlling operation of the robot 10. The base controller 202 is configured to process data relating to the inertial measurement unit 210, the actuators 206, and the sensor(s) 208 for operating the robot base 12. The base controller 202 receives measurements from the inertial measurement unit 210 and the one or more sensors 208 disposed on the base 12, and instructs actuation of at least one of the actuators 206 to change a configuration (i.e., a location $L_{12}$ and/or pose $P_{12}$) of the base 12.

The actuators 206 of the base control system 200 may include, without limitation, one or more of pneumatic actuators, hydraulic actuators, electro-mechanical actuators, or the like. Furthermore, the actuators 206 may be configured as linear actuators, rotary actuators, or a combination thereof. The actuators 206 may be disposed on the robot 10 at various locations to effect motion of the base 12. For example, each of the legs 16 of the robot 10 may include a plurality of actuators 206 to change a configuration of one or more joints 22, 24.

The sensor(s) 208 of the base control system 200 may include, without limitation, one or more of force sensors, torque sensors, velocity sensors, acceleration sensors, position sensors (linear and/or rotational position sensors), motion sensors, location sensors, load sensors, temperature sensors, touch sensors, depth sensors, ultrasonic range sensors, infrared sensors, object sensors, and/or cameras. The sensors 208 may be disposed on the base 12 at various locations such as the body 14 and/or the legs 16, and are configured to provide corresponding base sensor data to the base controller 202 for monitoring and controlling operation of the robot 10 within the environment 2. In some examples, the base controller 202 is configured to receive base sensor data from sensors 208 physically separated from the robot 10. For instance, the base controller 202 may receive sensor data from a proximity sensor disposed on a target object the robot 10, or from a remote sensor within the environment of the robot 10.

The base sensor data from the sensors 208 may allow the base controller 202 to evaluate conditions for maneuvering the robot 10, altering a pose of the base 12, and/or actuating various actuators 206 for moving/rotating mechanical components such as one of the legs 16. In some examples, the base control system 200 employs one or more force sensors to measure load on the actuators 206 that move the base 12. The sensors 208 may further include position sensors to sense states of extension, retraction, and/or rotation of the body 14 and/or the legs 16.

The inertial measurement unit 210 is configured to measure an inertial measurement indicative of a movement of the robot 10 that results in a change to the pose $P_{12}$ of the robot base 12. The inertial measurement measured by the inertial measurement unit 210 may indicate a translation or shift of the center of mass of the robot 10. The translation or shift of the center of mass may occur along one or more of the fore-aft axis (x-axis), the lateral axis (y-axis), or the vertical axis (z-axis). For instance, the inertial measurement unit 210 may detect and measure an acceleration, a tilt, a roll, a pitch, a rotation, or yaw of the robot 10, as the inertial measurement, using an initial pose as an inertial reference frame.

In some implementations, the base control system 200 includes one or more power sources 212 configured to power various components of the robot 10. The power sources 212 employed by the robot 10 may include, without limitation, a hydraulic system, an electrical system, energy storage device(s) (e.g. batteries), and/or pneumatic devices. For instance, one or more energy storage devices may provide power to various components (e.g., actuators 206) of the base 12. In some examples, the body 14 defines a compartment for storing and retaining energy storage devices. The energy storage devices may be chargeable via wired connections or wireless (e.g. induction) connections to an external power source. Energy storage devices could also be charged using solar energy (e.g., generated via solar panels disposed on the robot 10). In some examples, the energy storage devices are removable so that depleted energy storage devices can be replaced with fully-charged energy storage devices. Gasoline engines could also be employed. A hydraulic system may employ hydraulic motors and cylinders for transmitting pressurized fluid for operating various components of the robot 10.

In the example shown, the robot 10 includes an arm control system 100 connected to the arm 30 and operating independently of the base control system 200. In the example shown, the arm control system 100 includes an arm controller 102 (e.g., data processing hardware), memory hardware 104, actuators 106, and one or more sensors 108. The memory hardware 104, actuators 106, and sensors 108 may include similar components and configurations as those described above with respect to the memory hardware 104, actuators 206, and sensors 208 of the base control system 200.

Optionally, one or more of the memory hardware 104, actuators 106, 206, and sensors 108, 208 may be shared between the control systems 100, 200. In some implementations, portions of the base controller 202 and the arm controller 102 execute on a remote device 60 in communication with the robot 10. Optionally, the remote device 60 may provide commands 62 to the robot 10 to move/control the base 12 and/or the articulated arm 30 for performing a task.

The sensor(s) 108 of the arm control system 100 may include, without limitation, one or more of force sensors, torque sensors, velocity sensors, acceleration sensors, position sensors (linear and/or rotational position sensors), motion sensors, location sensors, load sensors, temperature sensors, touch sensors, depth sensors, ultrasonic range sensors, infrared sensors, object sensors, and/or cameras. The sensors 108 may be disposed on the arm 30 at various locations such as the arm portions 32, 34, 36 and/or the joints 40, 42, 44, and are configured to provide corresponding arm sensor data 109 to the arm controller 102 and/or the base controller 202 for monitoring and controlling operation of the robot 10 within the environment 2. In some examples, the arm controller 102 is configured to receive the arm sensor data 109 from sensors 108 physically separated from the robot 10. For instance, the arm controller 102 may receive arm sensor data 109 from a proximity sensor disposed on a target object the robot 10, or from a remote sensor within the environment of the robot 10.

The arm controller 102 of the robot 10 controls moving the articulated arm 30 between arm poses $P_{30}$ within the arm workspace 4. For instance, the articulated arm 30 may need to move from a start pose to a target pose when the robot 10 is executing the task request 62. For instance, in a scenario when the robot 10 needs to open a door while navigating in an environment, the robot arm controller 102 will need to move the articulated arm 30 from a first arm pose where the door is in a closed position to a second arm pose where the door is in an open position.

Movements and poses of the robot 10 and robot appendages 16, 30 may be defined in terms of a robot environment 2 based on a Cartesian coordinate system. In the examples of the robot 10 provided in FIGS. 1A-1D, the robot environment 2 may be defined by six dimensions including the translational axes x, y, z and the rotational axes $\Theta_x$, $\Theta_y$, $\Theta_z$. Referring to FIGS. 1B and 1D, the pose $P_{30}$ of the arm 30 can be selectively reconfigured to change positions and orientations of the end effector 36 within a workspace 4 of the articulated arm 30. The workspace 4 of the end effector 36 is provided relative to the base 12 of the robot 10. In other words, the end effector 36 of the articulated arm 30 can reach any position within the workspace 4 without adjusting a pose $P_{12}$ of the robot base 12. However, in some scenarios, the robot 10 may need to perform tasks that are outside of the arm workspace 4. For example, the robot 10 may need to move a box 6b or apply a mark 6a that falls outside of the arm workspace 4. In these scenarios, the robot 10 must coordinate movements of the arm 30 and the base 12 to complete the task, whereby the base 12 of the robot 10 must move within the environment 2 to allow the articulated arm 30 to reach the location of the task 6a, 6b.

Figure 2A:
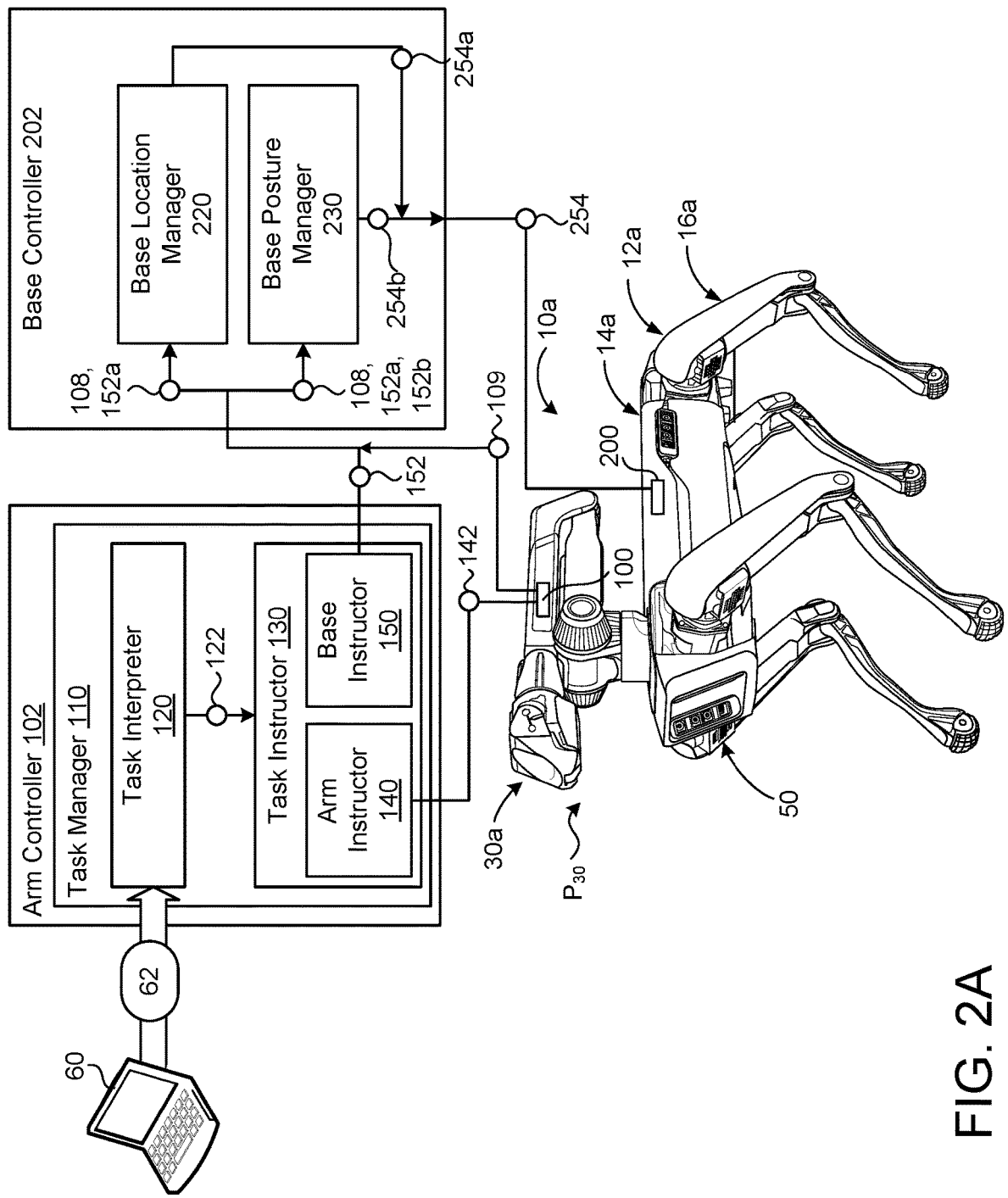
FIG. 2A is a schematic view of an example of an arm controller and base controller for a robot having a mobile base and an articulated arm.

With reference to FIG. 2A, the arm controller 102 includes a task manager 110 having a task interpreter 120 configured to receive or obtain task requests 62 from the remote device 60 and to generate translated task requests 122 executable by the arm controller 102 to move the robot arm 30 and/or base 12. The task manager 110 further includes a task instructor 130 including an arm instructor 140 and a base instructor 150 configured to generate unique task instructions 142 for the arm 30 and parameters 152 for the base 12 using the translated task request 122. Thus, as described later, the task manager 110 generally receives a task request 62 and generates a set of task instructions 142 to be executed by the arm 30 within the arm workspace 4 and a set of parameters 152 to be executed by the base 12 for moving the workspace 4 within the robot environment 2.

Figure 2B:
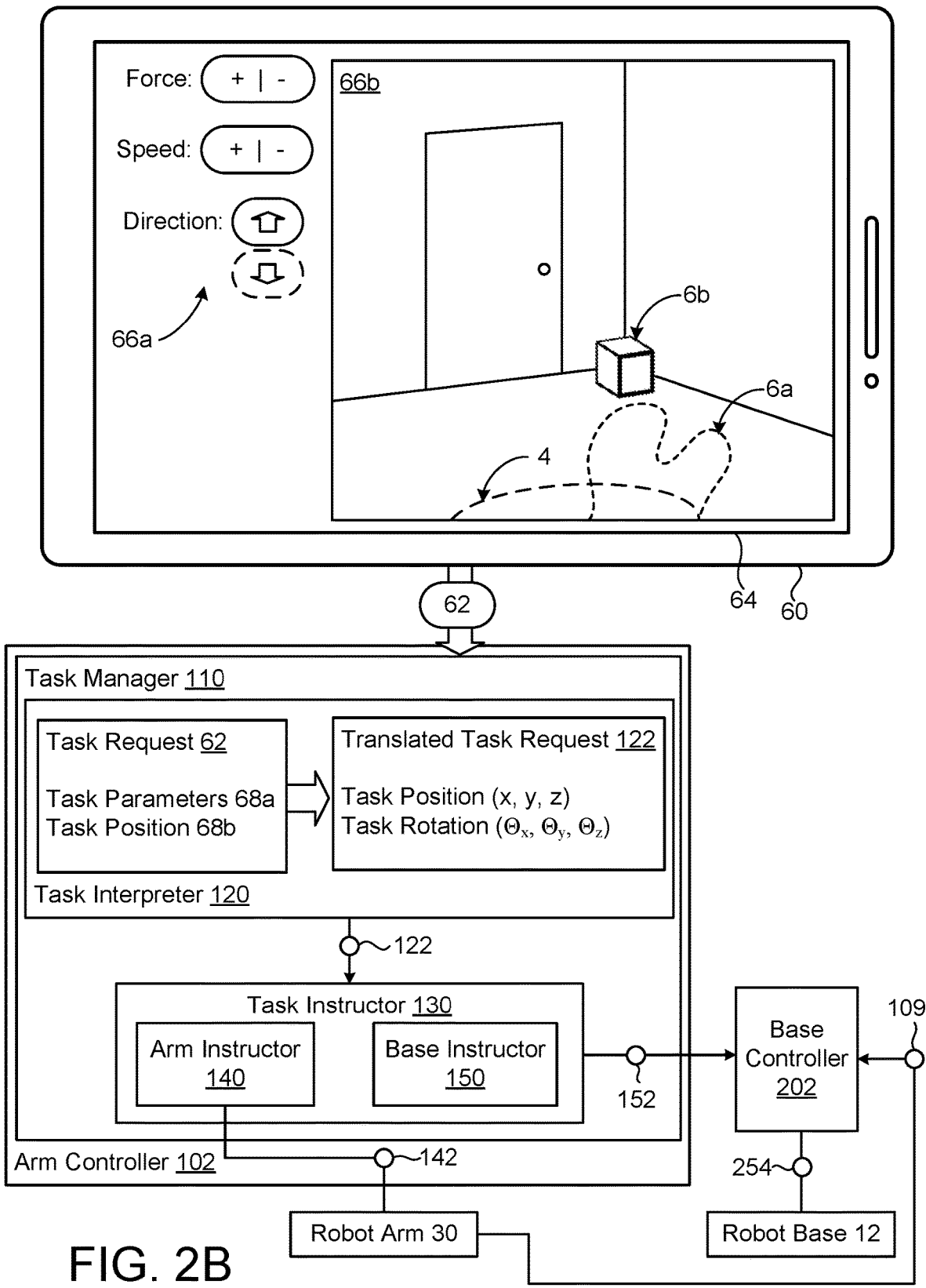
FIG. 2B is a schematic view of a robot arm controller and a remote device for controlling a robot.

FIG. 2B shows an example operation of the task interpreter 120 generating the translated task request 122 based on the task request 62 received or obtained from the remote device 60. In some examples, task requests 62 may be autonomously generated by the remote device 60 based on a program. Additionally or alternatively, a user may engage with a user interface 64 in communication with the remote device 60 to select task characteristics 68, 68a, 68b for the task request 62. For example, the user interface 64 may include one or more buttons 66a for selecting task parameters (e.g., speed, force, direction, etc.). The user interface 64 also includes a task location window 66b for identifying location of a path 6a or object 6b associated with the task request 62. The task location window 66b may be based on the image data from the camera 52 of the robot 10. Thus, a user can select a location within the field of view 56 of the robot 10. As shown, the task location window 66b may present graphical representation of the arm workspace 4 relative to the field of view 56 of the robot 10, allowing an operator to visualize the position of the task 6a, 6b relative to current position of the workspace 4. For example, the task location window 66b shows a path marking 6a and a box 6b that are positioned outside of the current workspace 4 of the articulated arm 30.

While presenting the user interface 64 with gesture-based buttons 66a and selection windows 66b simplifies user control of the robot arm 30 by providing an intuitive interface, the task request 62 generated by the remote device 60 may not be directly executable by the robot 10. Accordingly, the task interpreter 120 of the task manager 110 receives the task request 62 and translates the task characteristics 66 into translational and/or rotational coordinates based on the robot environment 2. The translated task request 122 is then sent to the task instructor 130.

The task instructor 130 includes the arm instructor 140 and the base instructor 150. The task instructor 130 receives the translated task request 122 from the task interpreter 120 and the arm instructor 140 and base instructor 150 cooperate to generate respective arm instructions 142 and base parameters 152 for performing the task 6a, 6b. The instructions 142 and parameters 152 are generated from the perspective of the end effector 36 and the current location of the workspace 4. Thus, where the arm controller 102 determines that the location of the task 6a, 6b is not within the current location of the workspace 4, the arm controller 102 determines the necessary base parameters 152 for repositioning the workspace 4 at the location of the task 6a, 6b and generates arm instructions 142 for performing the task within the new workspace 4 location.

The arm instructor 140 may be described as generating micro-level arm instructions 142 for positioning the end effector 36 within the arm workspace 4. For example, where a task 6a, 6b is located within then the arm workspace 4, the arm instructor 140 generates arm instructions 142 including micro-position coordinates (x, y, z), orientation coordinates ($\Theta x$, $\Theta y$, $\Theta A$ and end effector commands (e.g., actuate, deactuate). Conversely, the base instructor 150 may be described as generating macro-level base parameters 152 for controlling locomotion of the robot 10 to move the arm workspace 4 within the environment 2. For example, where a task 6a, 6b is located outside of the arm workspace 4 at the current location Liz or pose Piz, FIG. 2A shows the base instructor 150 generates base parameters 152 including macro-position coordinates 152a (x, y, z) and balance parameters 152b for the robot base 12. The macro-position coordinates 152a may be associated with a location of a center of mass of the robot base 12 or with the location of the first joint 40 of the robot arm 30.

When the task instructor 130 determines that the task 6a, 6b is positioned outside of the arm workspace 4 at the current location $L_{12}$ or pose $P_{12}$ and that macro-level positioning is needed from the robot base 12, the base instructor 150 sends the base parameters 152 to the base controller 202. Using the base parameters 152, the base controller 202 may then adjust a location $L_{12}$ or pose $P_{12}$ of the robot base 12 to move the arm workspace 4 to the task 6a, 6b. In addition to using macro-positioning for expanding the effective workspace 4 of the articulated arm 30, the base parameters 152 may include balance parameters 152b identifying arm forces anticipated by task instructor 130 in response to the arm instructions 142. For example, where the arm instructions 142 include providing relatively high forces at the end effector 36 and/or changing the center of mass for the robot 10 by extending the articulated arm 30, the balance parameters 152b may indicate the direction and magnitude of the arm force for consideration and compensation (i.e., counter-balancing) by the robot base 12.

At the base controller 202, the base parameters 152 are evaluated by a base location manager 220 and a base posture manager 230 to generate base instructions 254 for moving and/or configuring the robot base 12 according to the base parameters 152. For example, where the base parameters 152 include macro-position coordinates 152a, the base location manager 220 will generate base instructions 254a for moving the location $L_{12}$ or pose $P_{12}$ of the robot base 12 to move the robot workspace 4. Additionally or alternatively, the base posture manager 230 will generate base instructions 254b for changing the pose $P_{12}$ of the robot base 12 to counteract forces applied by or to the end effector 36 based on the balance parameters 152b generated by the task instructor 130.

Additionally or alternatively, the base controller 202 receives arm sensor data 109 from the arm sensors 108. The base controller 202 evaluates the arm sensor data 109 from the arm sensors 108 to generate or modify the base instructions 254 for moving and/or configuring the robot base 12. Thus, in addition to generating anticipatory base instructions 254 based on the base parameters 152 generated by the arm controller 102, the base controller 202 may also generate responsive base instructions 254 to move the base 12 to a responsive base configuration to account for actual forces measured at the robot arm 30. For example, where the initial base instructions 152 correspond to arm instructions 142 associated with opening a door, the base instructions 254 may anticipatorily instruct the base 12 to adjust the posture the base 12 to an anticipatory base configuration to counteract the expected force to be applied by the arm 30 to open the door. Additionally, the base controller 202 may evaluate the arm sensor data 109 received from the arm sensors 108 during the task to further adjust the location or posture of the base 12. Thus, the base controller 202 can modify or tune the base instructions 254 to account for variables (e.g., difference forces) not anticipated by the base instructor 150 when generating the base parameters 152.

As described, the robot 10 of the present disclosure takes advantage of discrete control systems 100, 200 to coordinate movements of the robot 10 associated with performing a task using the arm 30. Unlike conventional robotic systems, which rely on a computationally-intensive centralized controller for coordinating arm and base movements, the robot 10 of the present disclosure manages the robot 10 from the perspective of the arm controller 102. Thus, the arm controller 102 determines the parameters for executing the task and then segregates the task into arm instructions 142 and base parameters 152. The base controller 202 then evaluates the base parameters 152 and determines appropriate base instructions 254 for complying with the base parameters 152 provided by the arm controller 102, thereby minimizing the computational load on the base controller 202.

Additionally, providing arm sensor data 109 from the arm sensors 108 to the base controller 202 allows the base controller 202 to intelligently adjust the location or posture of the base 12 to account for measured forces applied to or by the arm 30. In contrast, conventional robotic systems only generate responsive actions at a base using the base sensor data received from the base sensors. Thus, when a force is applied to an arm of a conventional robotic system, the base is not informed of the magnitude or direction of the applied force by the arm sensors and only observes the forces from the perspective of the sensors of the base. Accordingly, the base can only react in response to base sensor data obtained from sensors within the base (e.g., leg sensors, IMU) to address instability caused by the force applied at the arm. Thus, the configuration of the present disclosure allows the robot base 12 and the articulated arm 30 to be provided as modular components and minimizes computational requirements for the base controller 202.

With reference to FIG. 1B, a first example of the robot 10a including the arm controller 102 and the base controller 202 is shown. In this example, the user has generated a task request 62 with the user interface 64 (FIG. 2B) for marking continuous path 6a along the ground surface of the robot environment 2 using the end effector 36. For instance, the end effector 36 may grasp or include a marking device (e.g., paint, chalk) that can be moved along the ground surface to apply the mark. As shown in FIGS. 1B and 2B, a portion of the mark 6a is located outside of the arm workspace 4 associated with the current location $L_{12}$ and/or pose $P_{12}$ of the robot base 12. Thus, to follow the entire path associated with the mark 6a, the robot 10 must change locations $L_{12}$ and/or reconfigure poses $P_{12}$ to move the workspace 4. For example, the robot base 12 and lower the body 14 must travel along the path of the mark 6a so that the arm 30 can reach the ground surface. To move the workspace 4, task instructor 130 of the arm controller 102 generates, via the base instructor 150, base parameters 152 indicating the macro-positional coordinates 152a and balance parameters 152b that must be accommodated by the base 12 to position and move the workspace 4 of the arm 30 along the path 6a. Using the base parameters 152, the base controller 202 instructs the robot base 12 to move along the path 6a.

Referring to FIGS. 1D and 2B, in another example the robot 10b includes the arm control system 100 and the base control system 200. In this example, the arm controller 102 receives a task request 62 from the remote device 60 for moving an object 6b (e.g., a box) that is located outside of the current location of the robot workspace 4. In the present example, the arm instructor 140 of the arm controller 102 generates arm instructions 142 for moving the arm 30b within the workspace 4 while the base instructor 150 of the arm controller 102 sends base parameters 152 to the base controller 202 for repositioning the workspace 4 within the environment 2. Thus, the base controller 202 may evaluate the base parameters 152 received from the arm controller 102 and determine that the location $L_{12}$ and/or the pose $P_{12}$ of the base 12 need to be adjusted to allow the articulated arm 30 to reach the object 6b or to move the object 6b to a new location. Additionally or alternatively, the arm controller 102 may receive task requests 62 for moving objects 6b that are within the arm workspace 4 to a location outside of the arm workspace 4.

Figure 3:
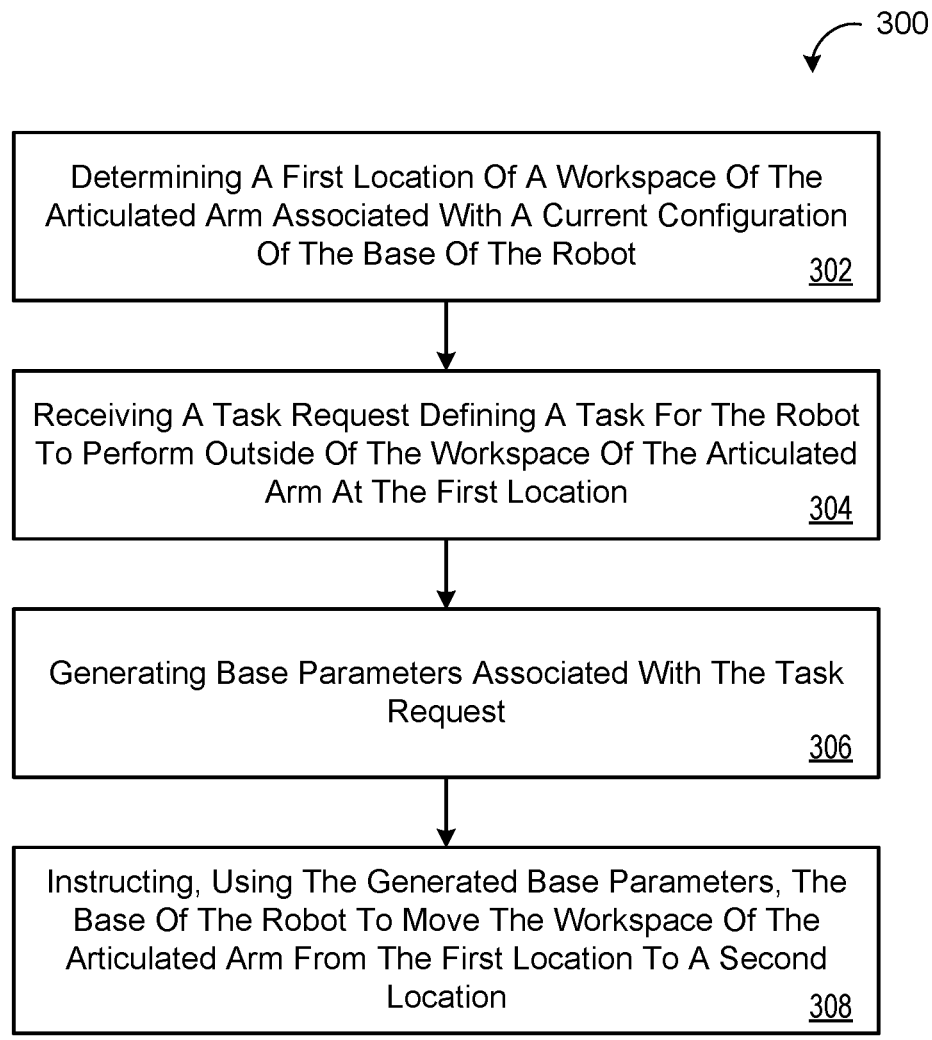
FIG. 3 is a flowchart of an example arrangement of operations for a method of constrained object manipulation for a robot arm.

FIG. 3 is a flowchart of an example arrangement of operations for a method 300 for coordinating robot base 12 and arm 30 tasks using an arm controller 102 and a base controller 202. The method 300 may be a computer implemented method executed by data processing hardware of the articulated arm 30, which causes the data processing hardware to perform operations. At operation 302, the method 300 includes determining a first location of a workspace of the articulated arm associated with a current configuration of the base of the robot. The method 300 further includes, at operation 304, receiving a task request defining a task for the robot to perform outside of the workspace of the articulated arm at the first location. At operation 306, the method 300 includes generating base parameters associated with the task request. At operation 308, the method 300 further includes instructing the base of the robot to move the workspace of the articulated arm from the first location to a second location using the generated base parameters.

Figure 4:
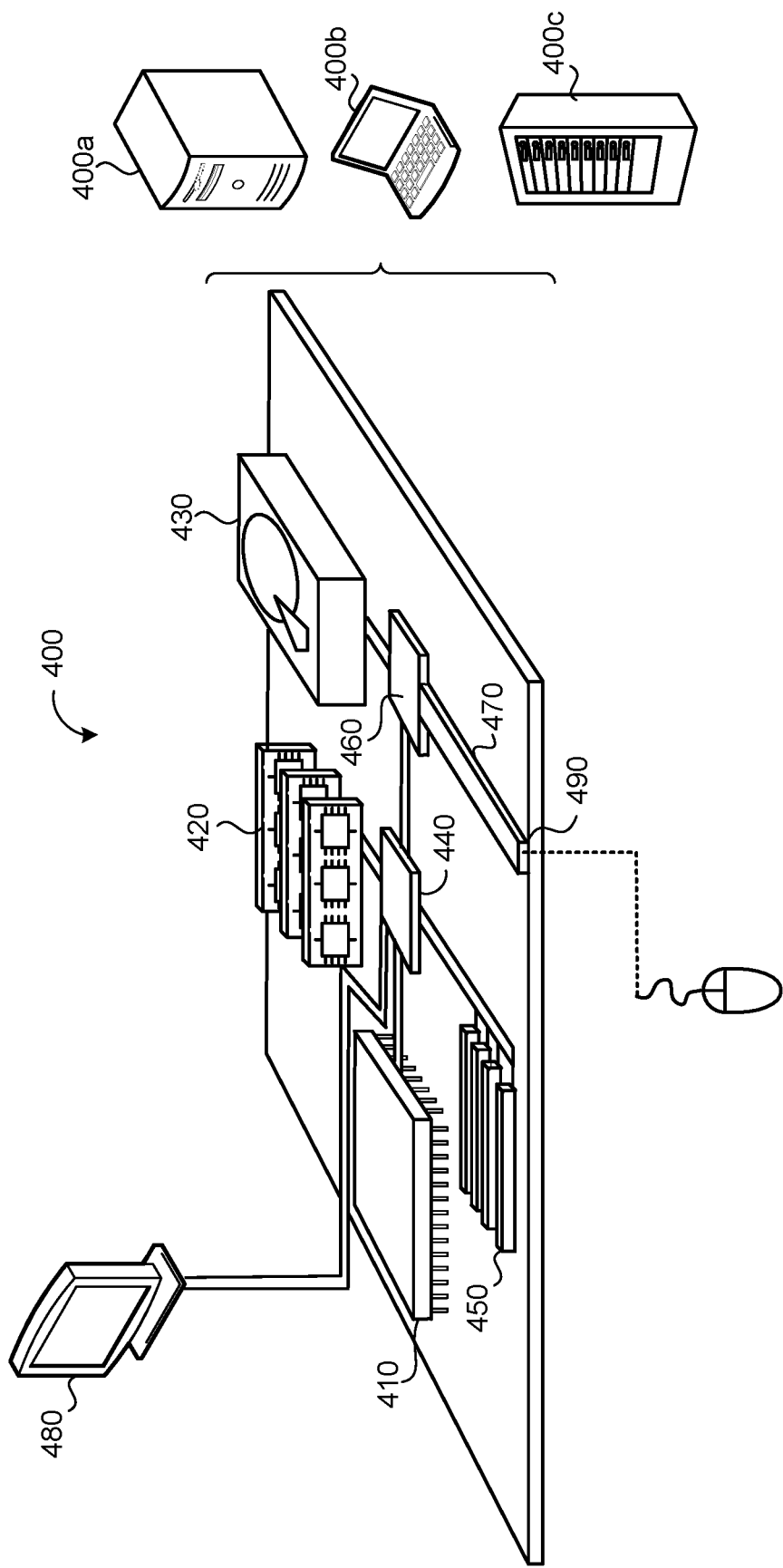
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 490, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that, when executed by data processing hardware of a robot having an articulated arm and a base, causes the data processing hardware to perform operations comprising:
   determining, by an arm controller of the data processing hardware, a first location of a workspace of the articulated arm associated with a current base configuration of the base of the robot;
   receiving, at the arm controller, a task request defining a task for the robot to perform outside of the workspace of the articulated arm at the first location;
   generating, by the arm controller, i) instructions for controlling the articulated arm to perform the task request and ii) base parameters associated with the task request, the base parameters including at least one balance parameter identifying anticipated forces associated with the articulated arm performing the task;
   providing the base parameters to a base controller of the data processing hardware;
   instructing, by the base controller, the base of the robot to move from the current base configuration to an anticipatory base configuration based on the base parameters; and
   instructing, by the base controller, the base of the robot to counter-balance the articulated arm performing the task based on the at least one balance parameter.

2. The method of claim 1, wherein instructing the base of the robot to move from the current base configuration to the anticipatory base configuration comprises instructing the base of the robot to move the workspace of the articulated arm from the first location to a second location.

3. The method of claim 2, wherein instructing the base of the robot to move the workspace of the articulated arm from the first location to the second location comprises instructing the base of the robot to change one of a location or a pose of the base.

4. The method of claim 1, wherein the operations further comprise generating arm instructions for changing a configuration of the articulated arm within the workspace of the articulated arm.

5. The method of claim 1, wherein the operations further comprise:
receiving arm sensor data of the articulated arm associated with changing a configuration of the articulated arm; and
instructing, based on the arm sensor data, the base of the robot to move from the anticipatory base configuration to a responsive base configuration.

6. The method of claim 1, wherein the base parameters further include position coordinates for the base of the robot.

7. The method of claim 1, wherein the task request comprises a request to move an object outside of the workspace of the articulated arm at the first location.

8. The method of claim 1, wherein the task request comprises instructing the base of the robot to follow a continuous path outside of the workspace of the articulated arm at the first location.

9. The method of claim 1, wherein:
the robot comprises a quadrupedal robot comprising four legs coupled to the base, and
instructing the base of the robot to counter-balance the articulated arm performing the task comprises instructing the legs of the robot to change a pose of the base of the robot.

10. A robot comprising:
a base;
an articulated arm coupled to the base;
data processing hardware comprising an arm controller and a base controller; and
memory hardware storing instructions that when executed by the data processing hardware cause the data processing hardware to perform operations comprising:
determining, by the arm controller, a first location of a workspace of the articulated arm associated with a current base configuration of the base of the robot;
receiving, at the arm controller, a task request defining a task for the robot to perform outside of the workspace of the articulated arm at the first location;
generating, by the arm controller, i) instructions for controlling the articulated arm to perform the task request and ii) base parameters associated with the task request, the base parameters including at least one balance parameter identifying anticipated forces associated with the articulated arm performing the task;
providing the base parameters to the base controller;
instructing, by the base controller, the base of the robot to move from the current base configuration to an anticipatory base configuration based on the base parameters; and
instructing, by the base controller, the base of the robot to counter-balance the articulated arm performing the task based on the at least one balance parameter.

11. The robot of claim 10, wherein instructing the base of the robot to move from the current base configuration to the anticipatory base configuration comprises instructing the base of the robot to move the workspace of the articulated arm from the first location to a second location.

12. The robot of claim 11, wherein instructing the base of the robot to move the workspace of the articulated arm from the first location to the second location comprises instructing the base of the robot to change one of a location or a pose of the base.

13. The robot of claim 10, wherein the operations further comprise generating arm instructions for changing a configuration of the articulated arm within the workspace of the articulated arm.

14. The robot of claim 10, wherein the operations further comprise:
receiving arm sensor data of the articulated arm associated with changing a configuration of the articulated arm; and
instructing, based on the arm sensor data, the base of the robot to move from the anticipatory base configuration to a responsive base configuration.

15. The robot of claim 10, wherein the base parameters further include position coordinates for the base of the robot.

16. The robot of claim 10, wherein the task request comprises a request to move an object outside of the workspace of the articulated arm at the first location.

17. The robot of claim 10, wherein the task request comprises instructing the base of the robot to follow a continuous path outside of the workspace of the articulated arm at the first location.

18. The robot of claim 10, further comprising:
four legs coupled to the base,
wherein instructing the base of the robot to counter-balance the articulated arm performing the task comprises instructing the legs of the robot to change a pose of the base of the robot.

19. A computer program product encoded on a non-transitory computer readable storage medium of a robot comprising a base and an articulated arm coupled to the base, the storage medium comprising instructions that when executed by a data processing apparatus cause the data processing apparatus to perform operations comprising:
determining, by an arm controller of the data processing apparatus, a first location of a workspace of the articulated arm associated with a current base configuration of the base of the robot;
receiving, at the arm controller, a task request defining a task for the robot to perform outside of the workspace of the articulated arm at the first location;
generating, by the arm controller, i) instructions for controlling the articulated arm to perform the task request and ii) base parameters associated with the task request, the base parameters including at least one balance parameter identifying anticipated forces associated with the articulated arm performing the task;
providing the base parameters to a base controller of the data processing apparatus;
instructing, by the base controller, the base of the robot to move from the current base configuration to an anticipatory base configuration based on the base parameters; and
instructing, by the base controller, the base of the robot to counter-balance the articulated arm performing the task based on the at least one balance parameter.

20. The computer program product of claim 19, wherein instructing the base of the robot to move from the current base configuration to the anticipatory base configuration comprises instructing the base of the robot to move the workspace of the articulated arm from the first location to a second location.

21. The computer program product of claim 19, wherein the operations further comprise generating arm instructions for changing a configuration of the articulated arm within the workspace of the articulated arm.

22. The computer program product of claim 19, wherein the operations further comprise:
- receiving arm sensor data of the articulated arm associated with changing a configuration of the articulated arm; and
- instructing, based on the arm sensor data, the base of the robot to move from the anticipatory base configuration to a responsive base configuration.

* * * * *